Nov. 19, 1929.  E. M. BOUTON  1,736,480
ELEVATOR CONTROL SYSTEM
Filed Nov. 17, 1927   2 Sheets-Sheet 2

INVENTOR
Edgar M. Bouton.
BY
ATTORNEY

Patented Nov. 19, 1929

1,736,480

UNITED STATES PATENT OFFICE

EDGAR M. BOUTON, OF CHICAGO, ILLINOIS, ASSIGNOR TO WESTINGHOUSE ELECTRIC & MANUFACTURING COMPANY, A CORPORATION OF PENNSYLVANIA

ELEVATOR-CONTROL SYSTEM

Application filed November 17, 1927. Serial No. 233,880.

My invention relates to motor-control systems and it has special reference to control systems for elevators to be operated from a source of alternating-current supply.

In a motor-control system, especially a control system for elevators and similar apparatus, it is desirable to use the motor as an electrical or dynamic braking device and, for this reason, it has been proposed to reconnect the elevator motor to the source of supply, with the connections reversed, during the deceleration period, so that the effect of the supply circuit upon the motor will be that of tending to reverse the motor, thus causing an electrical braking effect.

Several different expedients have been suggested and used, but all of these expedients depend upon switches which are maintained closed in one direction as long as the motor travels in one direction, and require that the motor shall be reversed in order to break the reversing circuits, or an additional speed responsive device is required to render the reversing device ineffective prior to actual reversal.

One of the objects of my invention is to provide means for causing reverse connections for the elevator motor to be set up when the motor is traveling in one direction, which connections will be automatically broken as the motor speed is reduced to a predetermined value.

Another object of my invention is to provide a reversing device, as described in the preceding paragraph, wherein it is unnecessary to reverse the motor in order to break the reversing or dynamic braking connections, and wherein the reversing device needs no additional speed responsive apparatus.

Figure 1:
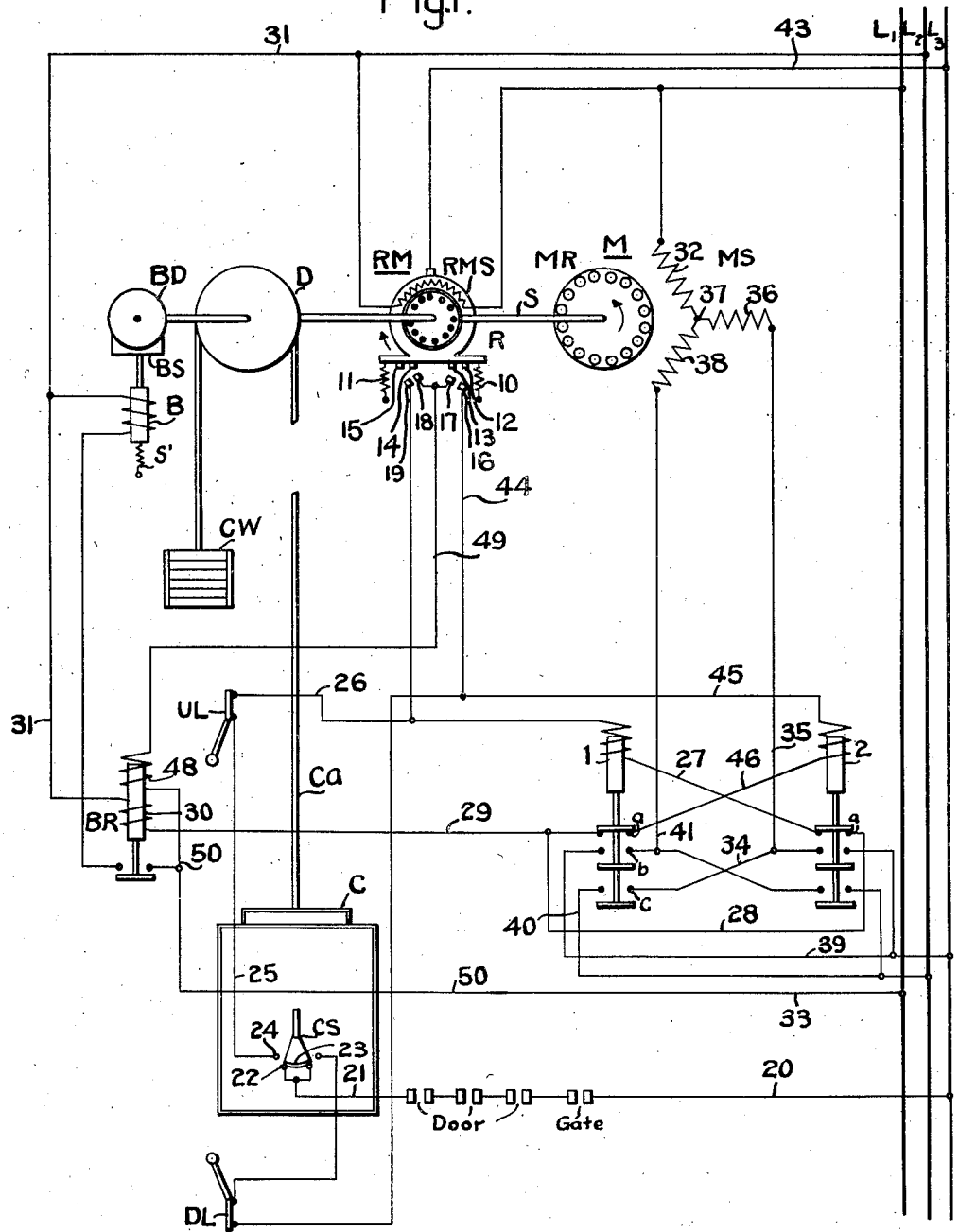
Figure 2:
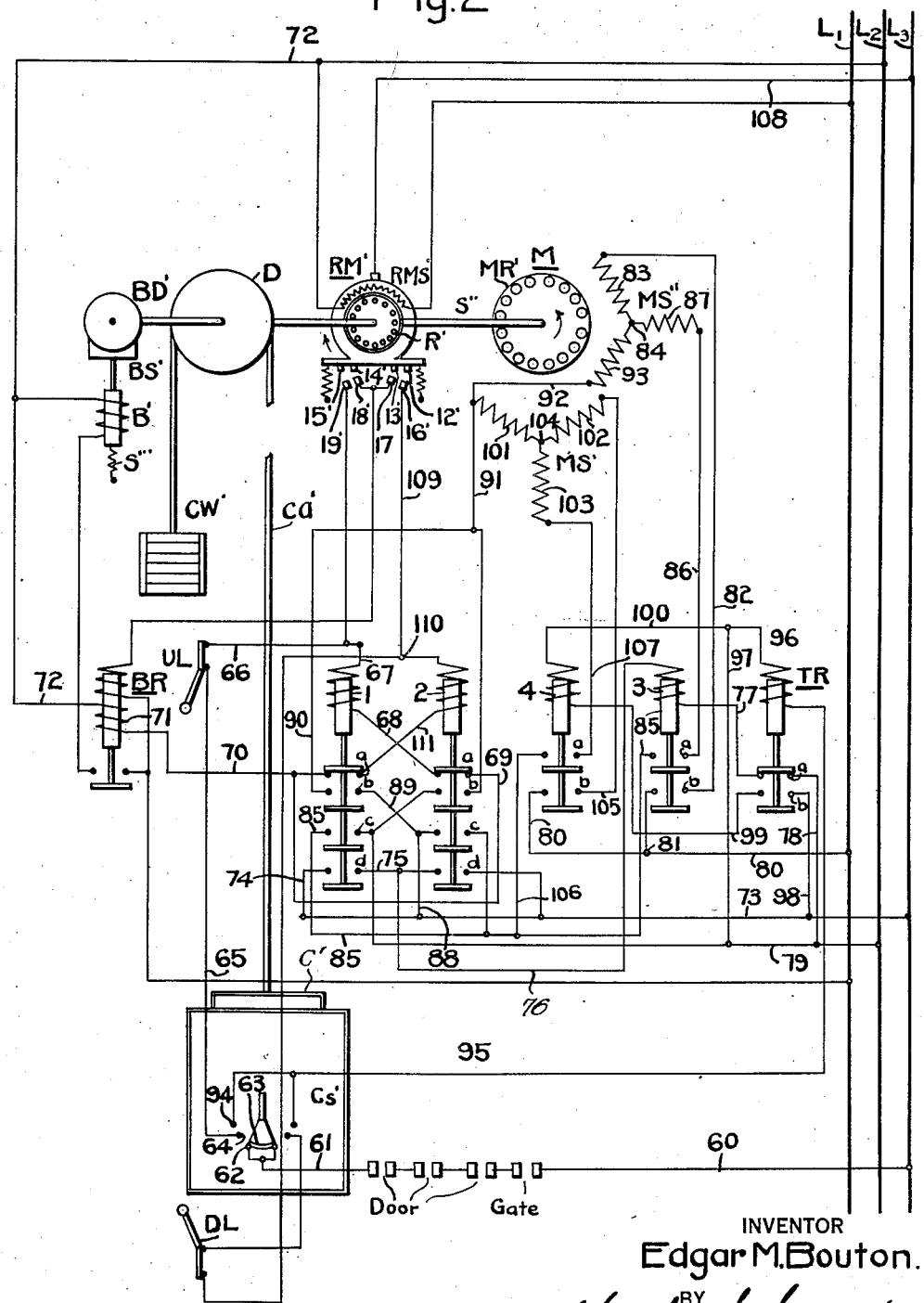

My invention will be described with reference to the accompanying drawings, wherein Fig. 1 is a diagrammatic view of my invention as applied to a single-speed elevator-control system; and Fig. 2 is a diagrammatic view illustrating my invention as applied to a two-speed elevator-control equipment.

Referring to Fig. 1, I have illustrated an elevator car C suspended from a cable Ca, which passes over a hoisting drum D to a suitable counterweight Cw. Directly coupled to the hoisting drum D, is an induction motor M comprising a multi-phase stator MS and a rotor MR. The stator is illustrated as being of the three-phase type, star-connected.

Upon the shaft S, which couples the motor M and the hoisting drum D, I have shown mounted a rotor R of a reversing or torque motor RM of the single-phase, squirrel-cage type, the synchronous speed of which is in excess of that of the main driving motor M. The stator RMS of the motor RM is mounted upon suitable springs 10 and 11 in such manner that rotation of the rotor R will influence the stator RMS to produce rotary motion of the stator in the direction opposite to that in which the rotor is moved. The stator RMS has its two terminals, respectively connected to two of the three-phase conductors of the source of supply, which conductors are designated as L1, L2 and L3. A third conductor 43 connects to the stator iron.

Upon some portion of the stator RMS, I propose to mount four contact members 12, 13, 14 and 15 for cooperation with contact members 16, 17, 18 and 19, respectively. When the main motor M is rotated in either direction, the stator RMS of the reversing motor RM will be moved in the opposite direction to close contact members 14—18 and 15—19 or 12—16 and 13—17, respectively, dependent upon the direction of such rotation.

The direction of movement of the main motor M is controlled through suitable up-direction and down-direction switches 1 and 2 which, in turn, are controlled through the movements of a car switch Cs. The operation of either the up-direction or the down-direction switch connects two phase windings of the stator of the main motor M selectively to supply conductors L2 and L3 in forward or reverse order.

Upon the outer end of the shaft S is a brake drum BD, against which a brake shoe Bs is normally projected under the force of a spring S'. A suitable brake-releasing coil B, when energized, withdraws the brake shoe Bs from engagement with the brake drum BD to permit the shaft S to rotate freely. The brake-releasing coil B is suitably controlled by actuation of a brake relay BR.

I have illustrated the brake relay BR as being provided with two coils, one of which is controlled through the circuit which operates the up-direction and down-direction switches 1 and 2, and the other of which is controlled through contact members 13—17 and 15—18 of the reversing motor RM, for a purpose hereinafter described.

The operation of my system will best be understood with reference to an assumed elevator operation. Assuming the elevator car to be stationary, the car switch Cs may be moved to the right to actuate the up-direction switch 1 to cause the car to travel upwardly. The circuit for the up-direction switch 1 extends from line conductor L3, through conductor 20, suitable door and gate switches, indicated by legends, conductor 21, contact members 22, 23 and 24 on the car switch Cs, conductor 25, "up" limit switch UL, such as is usually provided at the upper limit of travel to stop the elevator car, conductor 26, the coil of up-direction switch 1, conductor 27, interlocking contact members a of down-direction switch 2, conductors 28 and 29, the coil 30 on the brake relay BR and conductor 31, to line conductor L2. One phase winding 32 of the stator MS for the main motor M is permanently connected to line conductor L1 and thus the operation of up-direction switch 1 connects, through its contact members b and c, the remaining phase windings of the stator MS to line conductors L2 and L3, to start the motor M in the "up" direction. The circuits for these remaining phase windings extend from line conductor L2, through conductor 33, contact members c of up-direction switch 1, conductors 34 and 35, and phase winding 36 of the stator MS, to a common or star point 37, at which all of the phase windings 32, 36 and 38 are joined, and from line conductor L3, through conductors 39 and 40, contact members b of up-direction switch 1, conductor 41, and phase winding 38 on the stator MS, to the star point 37.

As the motor M starts in the direction of the arrow, the stator RMS of the reversing motor RM will be rotated oppositely, as indicated by the corresponding arrow, since the stator RMS is permanently connected across line conductors L1 and L2, and the inductive effect of rotation of the rotor R will be to move the stator RMS against the force of the springs 10 and 11 to engage contact members 12—16 and 13—17.

To stop the elevator car C, the car switch Cs is returned to its central or off position, thereby breaking the circuit to up-direction switch 1 at the car switch Cs. Direction switch 1, when deenergized, closes its interlocking contact members a, permitting immediate energization of the down-direction switch 2 through contact members 12—16, which were closed by the reversing motor RM. This circuit extends from line conductor L3 through conductor 48, the iron surrounding the stator RMS, contact members 12 and 16, conductors 44 and 45, the coil of down-direction switch 2, conductor 46, contact members a on up-direction switch 1 (now closed), conductor 29, coil 30 on brake relay BR and conductor 31 to line conductor L2. The energization of down-direction switch 2 causes the phase windings 38 and 36 to be respectively connected to line conductors L2 and L3 (which is the reverse of the connections previously made to cause the motor to move the elevator car upwardly). The effect of this connection is obviously to tend to reverse the movement of the rotor MR and, consequently, cause the rotor MR to decelerate rapidly to bring the car to a stop within a comparatively short distance of travel.

It will be observed that an additional energizing coil 48 is provided upon the brake relay BR, the circuit for which extends from line conductor L3, through conductor 43, contact members 13—17 on the reversing motor RM, conductor 49, the coil 48 on brake relay BR and conductor 50, to line conductor L1. This connection ensures that the brake will remain released until the motor MR is substantially stopped.

Since the torque of a single-phase induction motor may be made to vary directly as the speed from zero speed to somewhat less than synchronous speed, it will be seen that by properly designing the springs 10 and 11 to just counterbalance the torque developed by the reversing motor RM at some predetermined low speed, the circuit completed through contacts 12, 13, 14 and 15 may be broken before the final stopping of the main motor M. In this manner, the "plugging" of the main motor M is maintained only until the speed of the main motor M is reduced to a predetermined low value. At this time, the contact members 12—16 and 13—17 will be opened under the influence of springs 10 and 11, causing the down-direction switch 2 to drop out and open the circuit to the coil 48 of the brake releasing relay BR. The brake shoe Bs will now be applied and the elevator car C brought to a complete stop.

Referring to Fig. 2, I have illustrated a two-speed alternating-current motor M' having a rotor MR' and two stator windings, one for high speed, designated as MS', and one for low speed, designated as MS". A reversing or torque motor RM', in all respects similar to the reversing motor RM described with reference to Fig. 1, is disposed upon the shaft S", which connects the rotor MR' to the hoisting drum D'. A brake is illustrated in this figure as comprising a brake drum BD', upon which a shoe Bs' is normally maintained in engagement with the brake drum BD' through the operation of a spring S'''. A brake-releasing coil B' serves the same purpose as in Fig. 1.

The elevator car C', suspended upon the cable Ca', which passes over the hoisting drum D' to a suitable counterweight Cw', carries a car switch Cs' which operates to control up and down-direction switches 1 and 2, as described for Fig. 1. The high-speed and low-speed windings MS' and MS" are suitably connected to the up-direction and down-direction switches 1 and 2 through the operation of a pair of relays 3 and 4, as hereinafter described. A transfer relay TR is provided for selectively actuating the speed relays 3 and 4.

In this form of the invention, the reversing motor RM' is used to reconnect the slow-speed-winding MS" in the reverse direction whenever the car switch Cs' is centered to stop the elevator car. In other words, the slow-speed winding MS" is used as a dynamic brake to reduce the speed of the motor M' to a predetermined low value.

The operation of this form of my invention is best understood with reference to an assumed operation of the elevator. Assuming, as described for Fig. 1, it is desired to move the elevator car C' upwardly, the car switch Cs' is moved to the right, thereby supplying current to the up-direction switch 1, through a circuit which extends from line conductor L3 through conductor 60, suitable door and gate switches, appropriately labeled, conductor 61, contact members 62, 63 and 64 on the car switch Cs', conductor 65 and up-limit-switch UL, conductors 66 and 67, the coil of up-direction switch 1, conductor 68, interlocking contact members a of down-direction switch 2, conductors 69 and 70, coil 71 on brake-releasing relay BR', and conductor 72, to line conductor L2.

Up-direction switch 1, when actuated, completes a circuit for the slow-speed winding MS" through slow-speed relay 3. The circuit for the energizing coil of relay 3 is completed through contact members d on up-direction switch 1 and extends from line conductor L3, through conductors 73 and 74, contact members d of up-direction switch 1, conductors 75 and 76, the coil of slow-speed relay 3, conductor 77, normally closed contact members a on transfer relay TR and conductors 78 and 79, to line conductor L2. The slow-speed windings MS" now receive current by way of circuits which extend from line conductor L1 through conductors 80 and 81, contact members b of relay 3, conductor 82 and one phase 83 of the slow-speed winding MS to a common or star point 84; from line conductor L2, through conductor 79, contact members c of up-direction switch 1, conductor 85, contact members a of relay 3, conductor 86 and the second phase 87 of the stator MS, to star point 84; and from line conductor L3 through conductors 73, 88 and 89, contact members b of up-direction switch 1, conductors 90, 91 and 92 and phase 93 of the stator MS" to the star point 84. The motor M' thereupon starts to move the elevator car C' upwardly.

If the car switch Cs' is now moved toward the right to its extreme position, a circuit will be completed for the transfer relay TR, which circuit extends from the line conductor L3, through conductors 60 and 61, contact members 62, 63 and 94 of the car switch Cs', conductor 95, the coil of transfer relay TR and conductors 96, 97 and 79, to line conductor L2. Transfer relay TR thereupon opens its contact members a and closes its contact members b, to thereby disconnect the slow-speed winding MS" and to connect the high-speed winding MS' through the consequent operations of relays 3 and 4. Upon the actuation of transfer relay TR, its contact members a break the circuit to relay 3, while its contact members b complete a circuit for energizing relay 4, which circuit extends from line conductor L3, through conductors 73 and 98, contact members b of transfer relay TR, conductor 99, the coil of high-speed relay 4 and conductors 100, 27 and 79, to line conductor L2. The three phases 101, 102 and 103 of the high-speed winding MS' now receive current by way of circuits extending from line conductor L3, through conductors 73, 88 and 89, contact members b of up-direction switch 1, conductors 90 and 91, and phase 101, of high-speed winding MS', to a star point 104; from line conductor L1, through conductor 80, contact members b of high-speed relay 4, conductor 105, and phase 102 of high-speed winding MS', to star point 104; and from line conductor L2, through conductor 79, contact members c of up-direction switch 1, conductors 85 and 106, contact members a of high-speed relay 4, conductor 107 and phase 103 of high-speed winding MS' to star point 104.

If the car switch Cs' is moved to the left to slow down the car, it will disengage its contact member 94, and the transfer relay TR will drop out, thus opening the circuit for the high-speed relay 4 and reestablishing the circuit for the slow-speed relay 3.

As was described with reference to Fig. 1, the reversing motor RM' will be actuated by movement of the main motor M' to close its contact members 12'—16' and 13'—17'. Therefore, if the car switch Cs' is now centered to stop the elevator car, a circuit will be completed, through interlocking contact members a of up-direction switch 1, to energize the down-direction switch 2. This circuit extends from line conductor L3, through conductor 108, the iron of the stator RMS' of the reversing motor RM', contact members 12' and 16', conductors 109 and 110, the coil of down-direction switch 2, conductor 111, contact members *a* of up-direction switch 1 and conductors 70 and 72, to line conductor L2. Therefore, when the down-direction switch 2 is energized, a circuit is completed for the slow-speed winding MS'', with phases 87 and 93 connected in reverse order.

As was described with reference to Fig. 1, the reverse connection is maintained until the speed of the motor M' is reduced to a predetermined value (less than the synchronous speed of the reversing motor RM'), at which time, the reversing motor RM' will release its contact members to permit application of the brake and final stopping of the motor.

The transfer relay TR, therefore, serves a double purpose, namely, that of determining which of the speed windings MS' or MS'' will be energized upon initial movement of the car switch Cs', and that of insuring reconnection of the slow-speed winding MS'' only, when the car switch is centered.

In both Fig. 1 and Fig. 2, I have illustrated the additional coil upon the brake relay BR or BR' which will be energized through the movements of the reversing motor RM'. This connection ensures that the brake remains released through the transition periods between the respective energizations of up-direction switch 1 and down-direction switch 2 in the stopping operation.

It is thus seen that I have provided a system for dynamically braking an alternating-current elevator motor, in which the braking effect is maintained only until the speed of the motor has been reduced to a predetermined value, and in which it is unnecessary that the elevator car should be reversed to break the reversing connections. This construction obviates the necessity of providing an additional break in the circuit for the plugging or reversing connections to the motor-controlling relays in the stopping movement.

As the foregoing description is merely illustrative, I do not desire to be limited to the details shown therein, except as defined in the appended claims.

I claim as my invention:

1. In an elevator-control system, a motor, a source of alternating current therefor, means for connecting said motor to said source to operate said motor, and means for reversing the connections of said motor to said source to produce an electrical braking effect, said means comprising a magnetic element rotated by said motor, a cooperating magnetic element having limited movement under the influence of said rotating element, and circuit-controlling means for reversing the connections of said motor, said means being operable in response to the movements of said influenced element.

2. In an elevator-control system, an elevator motor, a source of power, means selectively operable to connect said motor to said source for movement in either of two directions, an electromagnetic switching device operably responsive to predetermined speeds of said motor in either direction for preparing connections for said motor for operation in the reversed direction, and means operably responsive to actuation of said selectively operable means to disconnect said motor for completing said reverse connections, whereby said motor will act as a dynamic brake while said motor is operating between said predetermined speeds.

3. In a motor-control system, an alternating-current motor, a source of alternating current, reversing switches selectively operable for connecting said motor to said source for movement in either of two directions, a switching device electromagnetically responsive to movements of said motor above a predetermined speed in either direction for actuating the reversing switches to operate said motor in the opposite direction, and means operable upon actuation of either of said reversing switches for rendering the other inoperative.

4. In an elevator-control system, a main motor, a source of alternating current therefor, means for connecting said motor to said source to operate said motor, and means operable upon disconnection of said motor from said source for reconnecting said motor for reverse operation to produce an electrical braking effect, said means comprising a torque motor having a synchronous speed greater than said main motor, means connecting the rotor of said torque motor for rotation by said main motor, means for mounting the stator of said torque motor for limited movement under the influence of said rotor, and circuit-controlling means operable by movement of said stator.

5. In an elevator-control system, a main motor, a source of alternating current therefor, means for connecting said motor to said source to operate said motor, and means operable upon disconnection of said motor from said source for reconnecting said motor for reverse operation to produce an electrical braking effect, said means comprising an electric motor, one element of which is connected for rotation by said main motor and the other element of which is mounted for limited movement under the influence of said rotated element, and circuit-controlling means operated by movement of said movably mounted element.

In testimony whereof, I have hereunto subscribed my name this 7th day of November, 1927.

EDGAR M. BOUTON.